(12) United States Patent  
Lampert

(10) Patent No.: US 6,547,450 B2  
(45) Date of Patent: Apr. 15, 2003

(54) QUICK-RELEASE DUST CAP FOR AN OPTICAL PLUG

(75) Inventor: Norman R Lampert, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/892,432

(22) Filed: Jun. 27, 2001

(65) Prior Publication Data

US 2003/0002812 A1 Jan. 2, 2003

(51) Int. Cl.[7] ................................................. G02B 6/36
(52) U.S. Cl. ............................ 385/78; 385/77; 385/139
(58) Field of Search ............................ 385/76, 77, 78, 385/84, 139, 134, 53, 56, 60, 70, 72, 73

(56) References Cited

U.S. PATENT DOCUMENTS

| 4,640,575 | A |   | 2/1987  | Dumas ........................ 350/96.2 |
| 4,712,861 | A |   | 12/1987 | Lukas ........................ 350/96.21 |
| 4,979,792 | A |   | 12/1990 | Weber et al. ................ 350/96.2 |
| 5,202,949 | A |   | 4/1993  | Hielman et al. ............. 385/134 |
| 5,210,810 | A | * | 5/1993  | Darden et al. ................ 385/78 |
| 5,363,460 | A |   | 11/1994 | Marazzi et al. ............... 385/70 |
| 5,481,634 | A |   | 1/1996  | Anderson et al. ............ 385/76 |
| 5,638,474 | A |   | 6/1997  | Lampert et al. .............. 385/78 |
| 5,647,043 | A |   | 7/1997  | Anderson et al. ............ 385/78 |
| 5,923,805 | A |   | 7/1999  | Anderson et al. ............ 385/86 |
| 6,041,155 | A |   | 3/2000  | Anderson et al. ........... 385/139 |
| 6,227,717 | B1 | * | 5/2001 | Ott et al. ...................... 385/53 |

* cited by examiner

Primary Examiner—Javaid Nasri  
(74) Attorney, Agent, or Firm—Michael A. Merra

(57) ABSTRACT

A dust cap 100 for an optical connector 200 protects an optical fiber 21 from abrasion, dust and debris. The dust cap is a box-like housing having front and back ends and side walls that define a cavity 13. The back end 12 has an opening into the cavity that is shaped to receive the optical connector, and a retaining feature 14 is molded into the cavity for interlocking with a mating feature 24 on the optical connector so that the dust cap will not become detached from the connector during vigorous handling. The optical fiber is generally supported within the connector by a ferrule 22, and the dust cap includes a tubular member 15 that is shaped to receive and enclose a front portion of the ferrule for improved protection. The distal end 16 of the tubular member is closed and projects outwardly from the front end 11 of the dust cap. The proximal end 17 of the tubular member projects inwardly and has an opening that is shaped to receive the ferrule. When installed on a connector plug, the proximal end forms a reverse trap to reduce the possibility of dust and debris from reaching the ferrule. Dust caps are preferably attached to each end of an optical jumper cord.

13 Claims, 3 Drawing Sheets

QUICK-RELEASE DUST CAP FOR AN OPTICAL PLUG

TECHNICAL FIELD

This invention relates generally to optical connectors, and more particularly to dust caps that attach to the optical connector and protect an optical fiber and ferrule from abrasion, dust and debris.

BACKGROUND OF THE INVENTION

Optical fiber connectors are used to facilitate mating of optical fibers to one another in an end-to-end relationship in order to permit optical energy to be transferred between fibers. Frequently, such connectors include a ferrule for terminating the exposed end of a glass fiber. An optical ferrule is a generally cylindrical tube that is made, for example, from a ceramic material and includes an axial bore for receiving and holding an end portion of the fiber. Nevertheless, the end face of the fiber is exposed to environmental hazards such as dust, debris and abrasion during the manufacture as well as the testing and handling of connectors. So that interconnections between fibers will have low loss, it is important to protect the end face of the optical fiber when it is not in use. Accordingly, it is known to provide a dust cap, or cover, for the end portion of an optical connector, adapter or other body associated with the connector.

One known type of dust cap is disclosed in U.S. Pat. No. 5,363,460 to Marazzi et al. that uses a flexible flap to cap a fiber optic connector to prevent emissions from the connector. The Marazzi flexible flap allows forcible deflection of the flap area, so that a mating connector can be attached to the normally capped connector, and yet when the mating connector is removed, the flap will automatically return to the capping position. According to Marazzi, in addition to preventing the emission radiation, the flap reduces contamination materials, such as dust, from adhering to the end of the optical fiber. However, incorporating such a dust cap into each connector not only increases the cost of the connector but also requires special receptacles for receiving each connector.

Another known type of dust cap is disclosed in U.S. Pat. No. 5,202,949 to Hileman et al. that comprises a base portion and at least one protruding portion extending therefrom, the protruding portion includes a cavity for receiving and capping the ferrule when the dust cap is mounted to the connector. The Hileman dust cap is used with connectors having a retractable body portion that normally surrounds the ferrule when the connector is not in use. The dust cap is permanently joined to the connector via a lanyard, and appears to be frictionally coupled to the connector when the dust cap is in use. Frictional coupling is undesirable because the force required to remove the dust cap from the connector may be too great or too little. It should not fall from the connector during normal handling but still be loose enough to be easily removed. Moreover, it is desirable to completely dissociate the dust cap from the connector during normal operation because of space constraints in a densely packed connection panel.

Accordingly, it is desirable to provide a dust cap for an optical connector that satisfies the conflicting demands of being completely and easily removable from the connector when the user requires removal, and being tightly held to the connector so that it does not become detached during vigorous handling.

SUMMARY OF THE INVENTION

A dust cap according to the invention is advantageously used to protect optical fiber(s) within an optical connector from abrasion, dust and debris when the optical connector is not in normal use. The dust cap is a box-like housing having front and back ends and side walls that define a cavity. The back end of the dust cap has an opening into the cavity that is shaped to receive the optical connector. A retaining feature is included within the cavity and is positioned to interlock with a mating feature on the optical connector so that the dust cap will not detach from the connector during vigorous handling. The dust cap further includes a tubular member (boss) that is shaped to receive and enclose the optical fiber, which may be held within a ferrule. The distal end of the tubular member is closed and projects outwardly from the front end of the dust cap. The proximal end of the tubular member projects into the cavity from the front end of the dust cap and has an opening for receiving the fiber. The proximal end forms a reverse trap, which reduces the possibility of dust reaching the end face of the ferrule where the optical fiber is exposed, analogous to a dust-free surface under a book shelf.

In an illustrative embodiment of the invention, the tubular member is recessed within the cavity so that the optical plug will be well aligned with the dust cap before the ferrule enters the tubular member. This prevents the forward end of the ferrule from contacting the proximal end of the tubular member during insertion. Preferably, the distance between the back end of the dust cap and the proximal end of the tubular member is more than five millimeters.

In the illustrative embodiment of the invention, the dust cap is designed to interlock with an LC-type optical plug, which includes a flexible cantilever latch having a pair of shoulders that mate with the retaining feature on the dust cap. The dust cap is easily and completely removed from the connector by merely depressing the latch. In the illustrative embodiment, LC-type connectors and dust caps are attached to the ends of an optical cable.

The dust cap is preferably molded from a thermoplastic material as a one-piece unit, which may be color coded for identification.

BRIEF DESCRIPTION OF THE DRAWING

The invention and its mode of operation will be more clearly understood from the following detailed description when read with the appended drawing in which.

DETAILED DESCRIPTION

Figure 1:
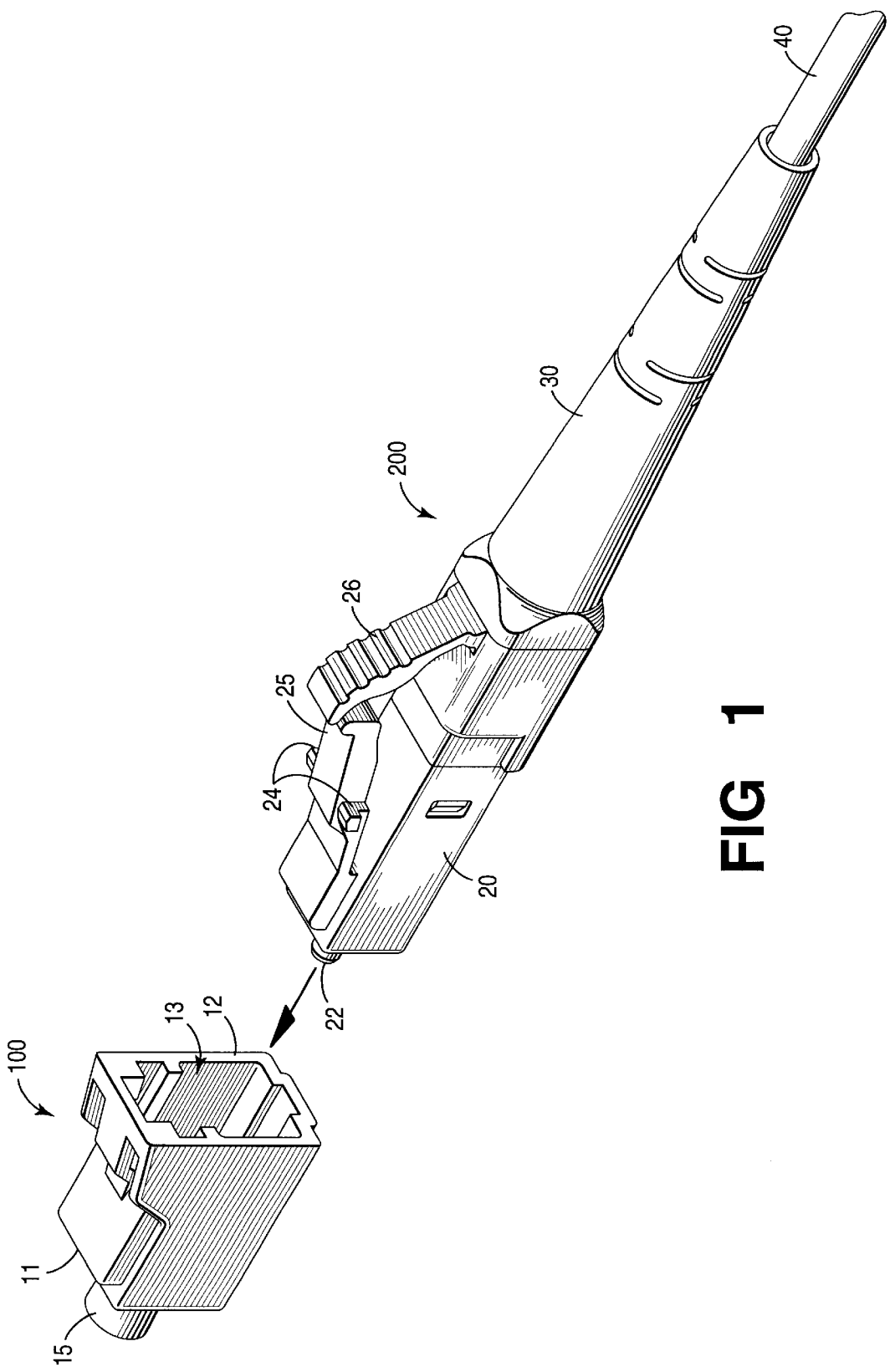
FIG. 1 is a back-end perspective view of an optical plug prior to insertion into a dust cap according to the invention.

The present invention solves the problem of protecting an optical fiber from abrasion, dust and debris during times when the optical fiber is not in active use such as between manufacture and test of an optical jumper cord and during shipment. This is of particular concern in situations where the ferrule, equipped with an optical fiber, protrudes from an optical connector and is directly exposed to the environment. For example, FIG. 1 shows a back-end perspective view of an optical connector 200 that contains an optical fiber, which is axially positioned within a cylindrical ferrule 22 that projects from the front end of a protective housing 20. Such a connector is referred to as an optical plug. The end face of the optical fiber 21 (see FIG. 5) is flush with the end face of the ferrule 22 and is vulnerable to scratching and environmental contamination during storage and handling. This is true irrespective of whether the optical fiber is made from glass or plastic or enclosed within a ferrule.

If, for example, a pair of optical fibers are interconnected together, end to end, but separated by dust particles, then there is a small air gap between the end faces of the fibers that introduces a discontinuity in the index of refraction, which leads to signal reflection and transmission loss. As shown in FIG. 1, a dust cap 100 (sometimes also called a "dust cover") is designed for easy attachment to, and quick release from, an optical connector 200. In this example embodiment, the optical connector 200 preferably comprises an LC plug, which is commercially available from Lucent Technologies Inc. The LC plug has a small cross-section area and can, therefore, be used in high density cross-connection panels. It features a latching arm 25 and trigger 26 that cooperate to facilitate the installation of the plug into a receptacle (not shown). A pair of shoulders 24-24 interlock the connector within the receptacle. Details regarding the design of various LC plugs are shown in U.S. Pat. Nos.: 5,481,634; 5,638,474; and 5,923,805. The latter patent discloses a connector for a plastic optical fiber, which also benefits from the dust cap 100 of the present invention.

Attached to the connector 200 is a length of optical cable 40 containing one or more fibers within a sheath system that typically includes tensile strength members, such as aramid fibers, and an outer plastic jacket. When such a cable 40 includes optical connectors (male and/or female designs) at each end, it is generally referred to as an optical jumper cord. A bend-limiting boot 30 is positioned at the junction between the relatively rigid connector 200 and the flexible optical cable 40 to preclude sharp bends in the optical fiber that cause transmission loss. In this example embodiment, the cable 40 includes a glass fiber that extends through the connector and is held within a ferrule 22, which is a cylindrical member having a small bore that extends axially between opposite ends thereof. The glass fiber, whose diameter is typically 125 microns, is adhesively held within the bore. It is the end face of this glass (or plastic) optical fiber that the dust cap 100 is designed to protect.

Dust cap 100 comprises a box-like housing having a front end 11, a back end 12, and side walls that define a cavity 13. An opening into the cavity 13 is located at the back end 12 of the housing and is shaped to receive the optical plug 200. A tubular member 15 is located within the cavity at the front end 11 of the housing to receive the ferrule 22 and protect it from adverse environmental conditions.

Figure 2:
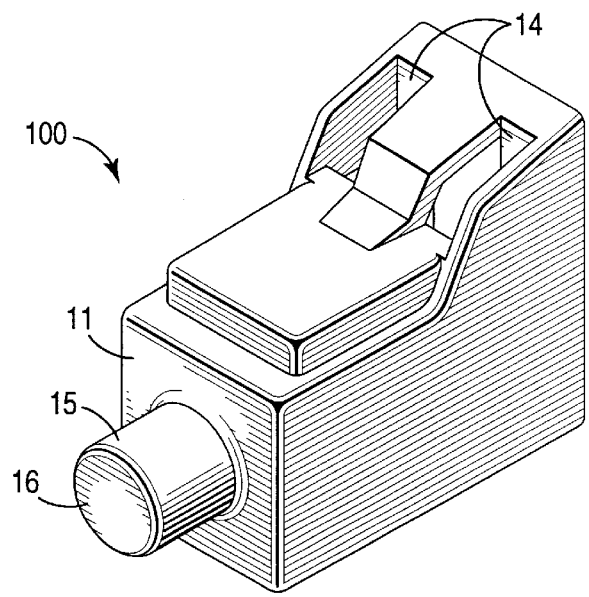
FIG. 2 is front-end perspective view of the dust cap of the invention.
Figure 3:
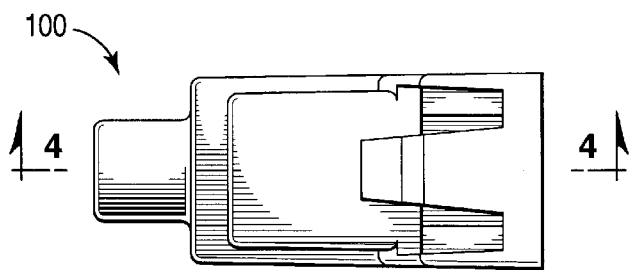
FIG. 3 is a top side view of the dust cap.
Figure 4:
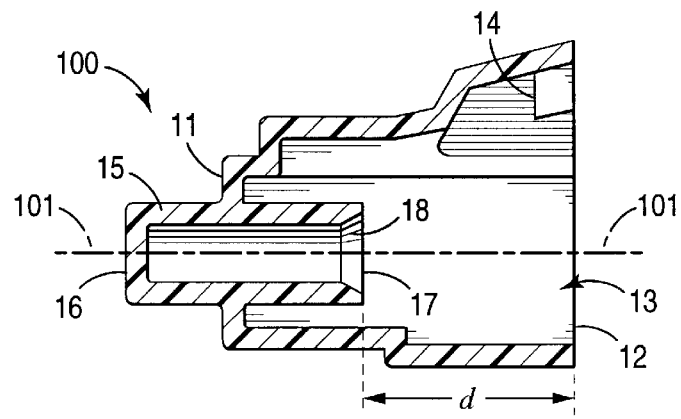
FIG. 4 is a side cross-section view of the dust cap of the invention.

FIGS. 2, 3 and 4 disclose various details regarding the construction of the dust cap 100. The tubular member 15 is shown to be cylindrical in these figures because it accommodates a known LC plug with a cylindrical ferrule. Nevertheless, optical ferrules having one or more rows of optical fibers are known and the tubular member 15 may be shaped to accommodate any optical ferrule cross section. Moreover, connectors are known (see U.S. Pat. No. 5,923,805) for plastic optical fiber(s) that do not use a ferrule because the diameter of the plastic fiber large enough to be self supporting. It is, therefore, understood that the dust cap of the present invention can be used with optical plugs containing large-diameter plastic optical fibers that are not contained within a ferrule.

The tubular member 15 comprises a tubular structure, preferably cylindrical, having a longitudinal axis 101-101 that is parallel to the direction of insertion of an optical plug 200 (see FIG. 1) into the dust cap 100. The tubular member 15 has a distal end 16 that is closed to prevent dust and debris from entering, and a proximal end 17 that is opened and shaped to receive a ferrule 22. Moreover, the proximal end 17 includes a chamfer 18 that is shaped to facilitate insertion of the ferrule into the tubular member. Significantly, the proximal end 17 of the tubular member is recessed within the cavity 13 by a distance "d" from the back end 12 of the dust cap. This is to assure that the optical plug 200 (see FIG. 1) will be well aligned with the dust cap before the ferrule 22 enters the tubular member 15—thereby preventing the forward end of the ferrule from contacting the proximal end 17 of the tubular member during insertion. The proximal end forms a reverse trap, which reduces the possibility of dust reaching the end face of the ferrule where the optical fiber is exposed. It is noted that the forward end of the ferrule protrudes from the front end of the optical plug by about two millimeters. For a tight fit between the optical plug and the cavity 13 of the dust cap, a distance "d" of slightly more than two millimeters (mm) would be adequate. However, it is desirable for the dust cap to fall away from the optical plug easily when the latching arm 25 is deflected, so a tight fit is undesirable. Accordingly, distance "d" needs to be greater than two (2) millimeters to accommodate a looser fit between the optical plug and the dust cap. Preferably, distance "d" is greater than three (3) mm and, in the illustrative embodiment of the invention, it is seven (7) mm.

In the preferred embodiment, tubular member 15 attaches to the front end 11 of the dust cap approximately midway between the distal 16 and proximal 17 ends of the tubular member. Nevertheless, it is understood that the tubular member may be attached to the front end 11 of the dust cap at other locations along the length of the tubular member.

An optical plug connector 200 (see FIG. 1) interlocks with the dust cap 100 via shoulders 24-24 that latch behind a pair of retaining features 14-14, which are molded into the dust cap. The shoulders 24-24 are located on the latching arm 25 of the optical plug connector. During the molding of the dust cap 100, the retaining features 14-14 are formed by overlapping cores so that no slides are required in the mold. The interlocking cooperation between the shoulder 24 and the retaining feature 14 is shown most clearly in FIG. 5, which shows a partial cross-section view of an optical jumper installed in the dust cap 100 of the invention.

Figure 5:
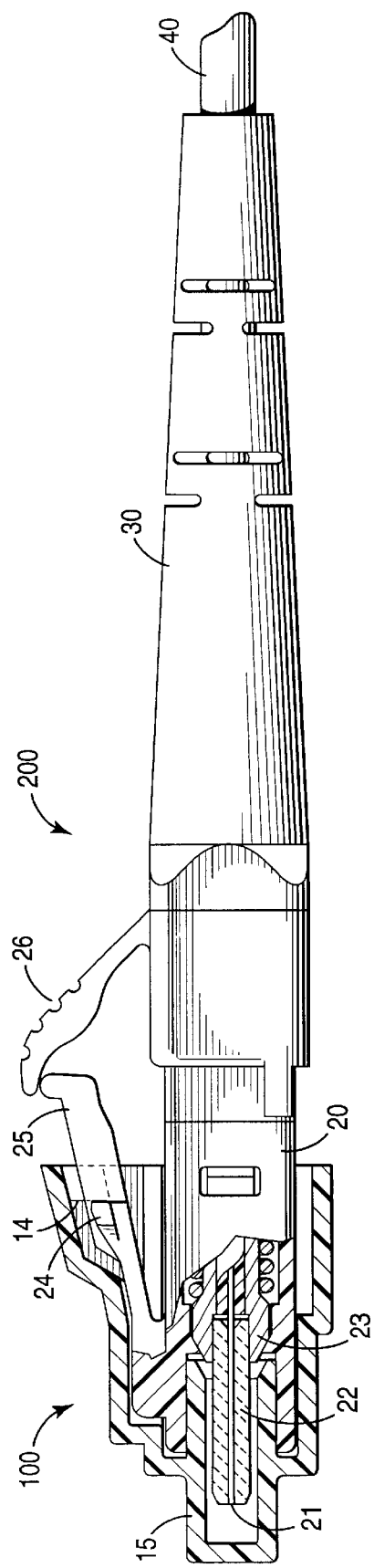
FIG. 5 is a partial cross-section view of an optical jumper installed in the dust cap of the invention.

As shown in FIG. 5, the optical jumper comprises a length of optical cable 40 that terminates in an optical plug connector 200. A bend-limiting boot 30 is disposed at the junction between the optical cable and the optical plug connector in order to limit the minimum bending radius of the optical fiber 21 that is contained within the cable at this junction. Illustratively, the optical fiber 21 is made from glass and typically has an outer diameter of 125 microns. An end portion of the optical fiber is supported within a bore that extends between opposite ends of a cylindrical ferrule 22, which is typically made from a ceramic material such as zirconia. The ferrule 22 is held within an end portion of a support member 23 that is held within a connector housing 20. A latching arm 25 includes a pair of shoulders 24-24 (only one is shown) on opposite sides to interlock with retaining surfaces 14-14 (only one is shown) that are molded into the dust cap. The dust cap is released by depressing the latching arm 25 downward—an operation that is aided by a cantilever trigger 26, which slidably engages the latching arm 25 when it is depressed. The trigger 26 not only prevents snagging of the connector when the cable is pulled backward through a concentrated area of cables and wires (see U.S. Pat. No. 5,638,474), but also improves user access to the latching arm 25. As shown in FIG. 5, the ferrule 22, and particularly its end face where the optical fiber itself is exposed, resides within the tubular member 15 and is thereby protected from dust, debris and abrasion during handling. Desirably, the inner diameter of the tubular member 15 is slightly larger than the outer diameter of the ferrule 22. In this illustrative embodiment of the invention, the inner diameter of the tubular member 15 is about 1.8 mm while the outer diameter of the ferrule 22 is about 1.25 mm.

Although various particular embodiments of the present invention have been shown and described, modifications are possible within the scope of the invention. For example, it is understood that the dust cap of the present invention may be used with optical plugs that contain plastic optical fiber with or without a ferrule, and that the tubular member need not be cylindrical.

What is claimed is:

1. A dust cap for an optical plug having a ferrule, said dust cap comprising a box-like housing having front and back ends and side walls that define a cavity, said housing including: (i) an opening at the back end that is shaped to receive the optical plug, (ii) a retaining feature for interlocking with a mating feature on the optical plug and holding the optical plug within the cavity, and (iii) a tubular member that is positioned within the cavity at the front end of the housing, said tubular member having a longitudinal axis that is parallel to the direction of insertion of the plug into the housing, said tubular member having a distal end that is closed and a proximal end with an opening that is shaped to receive the ferrule; wherein the distance between the proximal end of the tubular member and the back end of the dust cap, as measured along the longitudinal axis, is greater than three (3) millimeters.

2. The dust cap of claim 1 wherein the retaining feature comprises a pair of surfaces that reside in a plane that is approximately perpendicular to the longitudinal axis of the tubular member.

3. The dust cap of claim 1 wherein the tubular member is cylindrical.

4. The dust cap of claim 1 wherein the distal end of the tubular member protrudes from the front end of the housing.

5. The dust cap of claim 1 wherein the proximal end of the tubular member forms a dust trap that extends into the cavity of the housing.

6. The dust cap of claim 1 wherein the front end of the housing is affixed to the tubular member between its proximal and distal ends.

7. The dust cap of claim 1 wherein the proximal end of the tubular member is beveled to facilitate insertion of the optical ferrule.

8. The dust cap of claim 1 wherein the housing is molded from a thermoplastic material.

9. In combination, an optical jumper and a dust cap, the optical jumper comprising:

a length of optical cable containing at least one optical fiber; and an optical plug that terminates the optical cable at one end thereof, the dust cap comprising:

a box-like housing having a front end and a back end, the back end including an opening that is shaped to receive the optical plug;

a retaining feature that is molded into the housing for interlocking with a mating feature on the optical plug in order to hold the plug within the housing; and a tubular member that is affixed to the front end of the housing, said tubular member having a longitudinal axis that is parallel to the direction of insertion of the plug into the housing, said tubular member including a distal end that is closed and a proximal end with an opening for receiving the optical fiber; wherein the distance between the proximal end of the tubular member and the back end of the dust cap, as measured along the longitudinal axis, is greater than three (3) millimeters.

10. The combination of claim 9 wherein the optical plug comprises a fiber-holding apparatus for receiving and holding an end portion of the optical fiber;

a dielectric structure that encloses the fiber-holding apparatus; and a cantilever latch, which is positioned on a single side surface of the dielectric structure and contains the mating feature for engaging the retaining feature on the dust cap in a locking relationship.

11. The combination of claim 10 wherein the optical plug comprises an LC-type optical plug.

12. The combination of claim 10 wherein the fiber-holding apparatus comprises a cylindrical ferrule.

13. A molded plastic dust cap for an optical connector comprising a plurality of surfaces that define a cavity, which includes: (i) a generally rectangular opening at a back end of the dust cap for receiving the optical connector, (ii) a generally cylindrical boss that is affixed to a front end of the dust cap and includes a central axis that is parallel to the direction of insertion of the optical connector into the cavity, said boss having an opening at its proximal end for receiving an optical ferrule, said boss being closed at its distal end for shielding the optical ferrule from debris, and (iii) a nonmovable surface that is transverse to the central axis for interlocking with a movable feature on the optical connector and holding the optical connector within the cavity; wherein the distance between the proximal end of the tubular member and the back end of the dust cap, as measured along the central axis, is greater than three (3) millimeters.

* * * * *